(12) United States Patent
Deng et al.

(10) Patent No.: US 11,149,713 B2
(45) Date of Patent: Oct. 19, 2021

(54) CONTROL METHOD, DEVICE AND SYSTEM FOR A WIND TURBINE

(71) Applicant: XINJIANG GOLDWIND SCIENCE & TECHNOLOGY CO., LTD., Xinjiang (CN)

(72) Inventors: Gang Deng, Beijing (CN); Jinfeng Yin, Beijing (CN); Huixun Li, Beijing (CN); Xiang Zhao, Beijing (CN); Xianyou Wu, Beijing (CN)

(73) Assignee: XINJIANG GOLDWIND SCIENCE & TECHNOLOGY CO., LTD., Xinjiang (CN)

( * ) Notice: Subject to any disclaimer, the term of this patent is extended or adjusted under 35 U.S.C. 154(b) by 463 days.

(21) Appl. No.: 16/338,611

(22) PCT Filed: May 17, 2018

(86) PCT No.: PCT/CN2018/087321
§ 371 (c)(1),
(2) Date: Apr. 1, 2019

(87) PCT Pub. No.: WO2019/128047
PCT Pub. Date: Jul. 4, 2019

(65) Prior Publication Data
US 2020/0332766 A1 Oct. 22, 2020

(30) Foreign Application Priority Data
Dec. 29, 2017 (CN) .......................... 201711483516.6

(51) Int. Cl.
*F03D 9/00* (2016.01)
*H02P 9/04* (2006.01)
(Continued)

(52) U.S. Cl.
CPC ......... *F03D 7/0268* (2013.01); *F03D 7/0204* (2013.01); *F03D 7/042* (2013.01);
(Continued)

(58) Field of Classification Search
CPC ...... F03D 7/0204; F03D 7/0268; F03D 7/042; F03D 17/00; F05B 2270/107; F05B 2270/322; F05B 2270/329
See application file for complete search history.

(56) References Cited

U.S. PATENT DOCUMENTS

2005/0196280 A1  9/2005  Gonzalez et al.
2008/0195255 A1* 8/2008  Lutze ..................... F03D 9/257
                                                              700/291
(Continued)

FOREIGN PATENT DOCUMENTS

CN    101363404 A    2/2009
CN    103321840 A    9/2013
(Continued)

OTHER PUBLICATIONS

First Australian Exam Report dated Apr. 16, 2020; Appln. No. 2018334591.
(Continued)

*Primary Examiner* — Tulsidas C Patel
*Assistant Examiner* — Thomas K Quigley (57) ABSTRACT

The present disclosure provides a control method, device and system for a wind turbine. The control method includes: acquiring current working conditions of a power system, a yaw system and a communication system of the wind turbine when a typhoon warning signal is received; determining a target control strategy corresponding to the current working conditions according to a preset corresponding relationship between control strategies and working conditions of the power system, the yaw system and the commu-
(Continued)

nication system, wherein the control strategies may include an active windward strategy for controlling the yaw system to face typhoon wind direction, a controlled passive leeward strategy for controlling the yaw system to face opposite to the typhoon wind direction, and a passive leeward strategy for adjusting the yaw system to face opposite to the typhoon wind direction; and controlling the wind turbine by using the target control strategy.

18 Claims, 4 Drawing Sheets

(51) Int. Cl.
*F03D 7/02* (2006.01)
*F03D 17/00* (2016.01)
*F03D 7/04* (2006.01)

(52) U.S. Cl.
CPC ........ *F03D 17/00* (2016.05); *F05B 2270/107* (2013.01); *F05B 2270/322* (2013.01); *F05B 2270/329* (2013.01)

(56) References Cited

U.S. PATENT DOCUMENTS

| | | | |
|---|---|---|---|
| 2012/0046917 | A1 | 2/2012 | Fang et al. |
| 2012/0169052 | A1* | 7/2012 | Leipold-Buettner ... F03D 7/028 290/44 |
| 2013/0264822 | A1* | 10/2013 | Hsiao ................... F03D 7/0276 290/44 |
| 2016/0291204 | A1 | 10/2016 | Groenhagen |

FOREIGN PATENT DOCUMENTS

| | | |
|---|---|---|
| CN | 204024911 U | 12/2014 |
| CN | 105891546 A | 8/2016 |
| CN | 106593767 A | 4/2017 |
| CN | 106677983 A | 5/2017 |
| EP | 2003335 A2 | 12/2008 |
| EP | 1890034 B1 | 8/2016 |
| JP | 2007064062 A | 3/2007 |
| KR | 20160046147 A | 4/2016 |
| WO | 2010071339 A3 | 10/2010 |

OTHER PUBLICATIONS

The First Chinese Office Action dated Dec. 19, 2019; Appln. No. 201711483516.6.
International Search Report dated Sep. 29, 2018; PCT/CN2018/087321.

* cited by examiner

CONTROL METHOD, DEVICE AND SYSTEM FOR A WIND TURBINE

CROSS-REFERENCE TO RELATED APPLICATION

This application is based on and claims priority to Chinese Patent Application No. 201711483516.6 filed on Dec. 29, 2017, which is incorporated herein by reference in its entirety.

TECHNICAL FIELD

The present disclosure relates to the field of wind power generation technologies, and more particularly to a control method, device and system for a wind turbine.

BACKGROUND

In recent years, there have been more and more wind turbines installed in offshore or coastal areas, and both offshore and coastal areas are high-risk areas for typhoons. Therefore, in the offshore or coastal areas, typhoons will bring great challenges to the safety of the wind turbines. In view of this, each manufacturer of the wind turbines should consider how the wind turbines will respond to typhoon conditions when designing the wind turbines for use in the offshore or coastal areas. At present, some manufacturers enhance the ability of the wind turbines to resist typhoons by strengthening the structural strength of various components of the wind turbines. However, with the design scheme of strengthening the structural strength of various components of the wind turbines, the investment cost of the wind turbines will increase, but the ability of the wind turbines to resist typhoons having various strengths cannot be guaranteed. In addition, some manufacturers reduce the load of the wind turbines by manual control schemes, such as manually controlled passive yaw or manually controlled active yaw, to improve the survivability of the wind turbines under typhoon conditions. This requires manual intervention before the typhoon reaches the location of the wind turbines, which will inevitably lose a certain amount of power generation and increase the maintenance workload, however, not all situations under typhoon conditions can be well handled.

SUMMARY

Embodiments of the present disclosure provide a control method, device and system for a wind turbine to improve the safety of the wind turbine under typhoon conditions and reduce the workload of maintenance personnel during a typhoon.

In a first aspect, an embodiment of the present disclosure provides a control method for a wind turbine, including: acquiring current working conditions of a power system, a yaw system and a communication system of the wind turbine when a typhoon warning signal is received; determining a target control strategy corresponding to the current working conditions according to a preset corresponding relationship between control strategies and working conditions of the power system, the yaw system and the communication system, wherein the control strategies may include an active windward strategy for controlling the yaw system to face typhoon wind direction, a controlled passive leeward strategy for controlling the yaw system to face opposite to the typhoon wind direction, and a passive leeward strategy for adjusting the yaw system to face opposite to the typhoon wind direction; and controlling the wind turbine by using the target control strategy.

In a second aspect, an embodiment of the present disclosure provides a control device for a wind turbine, including: an acquisition module configured to acquire current working conditions of a power system, a yaw system and a communication system of the wind turbine when a typhoon warning signal is received; a processing module configured to determine a target control strategy corresponding to the current working conditions according to a preset corresponding relationship between control strategies and working conditions of the power system, the yaw system and the communication system, wherein the control strategies may include an active windward strategy for controlling the yaw system to face typhoon wind direction, a controlled passive leeward strategy for controlling the yaw system to face opposite to the typhoon wind direction, and a passive leeward strategy for adjusting the yaw system to face opposite to the typhoon wind direction; and a control module configured to control the wind turbine by using the target control strategy.

In a third aspect, an embodiment of the present disclosure provides a control system for a wind turbine, including the control device for the wind turbine according to the embodiment of the present disclosure in the second aspect and a typhoon monitoring system, wherein the control device may be communicatively coupled to the typhoon monitoring system.

According to the control method, device and system for the wind turbine provided by the embodiments of the present disclosure, the current working conditions of the power system, the yaw system and the communication system of the wind turbine may be acquired when the typhoon warning signal is received. The target control strategy corresponding to the current working conditions may be determined according to the preset corresponding relationship between the control strategies and the working conditions of the power system, the yaw system and the communication system, wherein the control strategies may include the active windward strategy for controlling the yaw system to face the typhoon wind direction, the controlled passive leeward strategy for controlling the yaw system to face opposite to the typhoon wind direction, and the passive leeward strategy for adjusting the yaw system to face opposite to the typhoon wind direction. The wind turbine may be controlled by using the target control strategy.

BRIEF DESCRIPTION OF THE DRAWINGS

The present disclosure will be better understood from the following detailed description of non-limiting embodiments of the present disclosure with reference to the drawings in which like or similar reference numerals indicate like or similar features.

DETAILED DESCRIPTION

The features and exemplary embodiments of various aspects of the present disclosure will be described in detail below. In the following detailed description, numerous specific details are set forth in order to provide a thorough understanding of the present disclosure. However, it will be apparent to those skilled in the art that the present disclosure may be practiced without some of these specific details. The following description of the embodiments is merely intended to provide a better understanding of the present disclosure by illustrating examples of the present disclosure. The present disclosure is by no means limited to any specific configuration and algorithm proposed below, but covers any modification, replacement and improvement of elements, components and algorithms without departing from the spirit of the present disclosure. In the drawings and the following description, at least some of the well-known structures and techniques are not shown in order to avoid unnecessarily obscuring the present disclosure.

A control method, device and system for a wind turbine provided by the embodiments of the present disclosure may acquire current working conditions of the wind turbine when a typhoon warning signal is received; and determine a target control strategy corresponding to the current working conditions according to a preset corresponding relationship between control strategies and working conditions of a power system, a yaw system and a communication system. Therefore, the target control strategy most suitable for the current working conditions of the wind turbine may be selected, and the safety of the wind turbine under typhoon conditions may be improved. Meanwhile, controlling the wind turbine by using the target control strategy may also reduce the workload of maintenance personnel during a typhoon.

The control method, device and system for the wind turbine provided by the embodiments of the present disclosure will be described in detail below with reference to FIG. 1 to FIG. 5.

Figure 1:
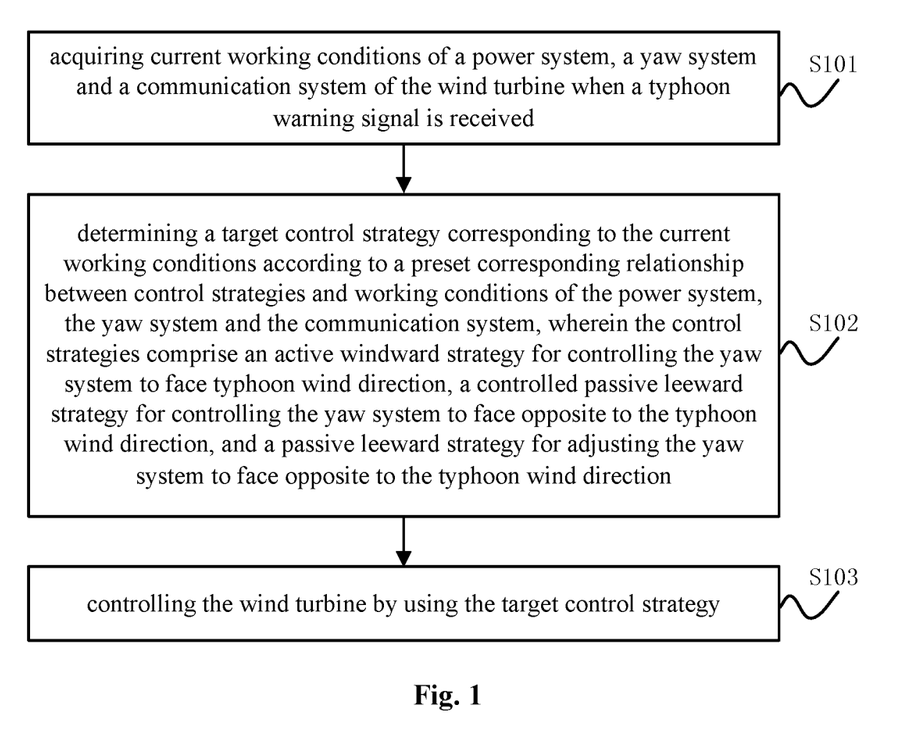
FIG. 1 is a schematic flow chart of a control method for a wind turbine according to an embodiment of the present disclosure.

FIG. 1 is a schematic flow chart of a control method for a wind turbine according to an embodiment of the present disclosure. As shown in FIG. 1, the control method for the wind turbine may include following steps.

S101, current working conditions of a power system, a yaw system and a communication system of the wind turbine may be acquired when a typhoon warning signal is received.

Wherein, the typhoon warning signal is generated by a typhoon monitoring system via monitoring typhoons based on meteorological information. Specifically, when the typhoon monitoring system monitors, according to the meteorological information, that an intensity of a typhoon whose path passes through a location of the wind turbine is greater than a preset intensity threshold, and/or that the location of the wind turbine is located within a typhoon eye or typhoon core region, the typhoon monitoring system may generate the typhoon warning signal and send the typhoon warning signal to the wind turbine. The meteorological information may include, but not limited to, the path and intensity of the typhoon; the preset intensity threshold may be set according to an empirical value, for example, the preset intensity threshold may be level 10.

Figure 2:
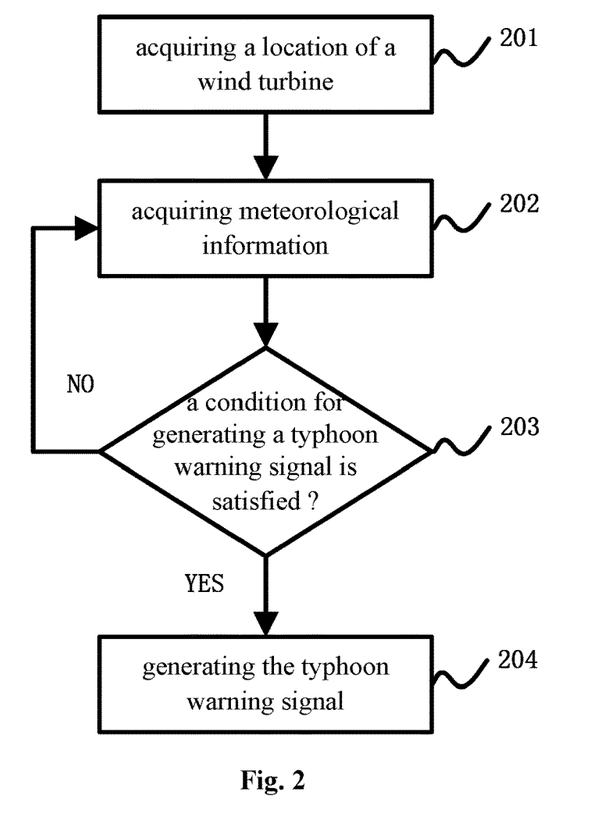
FIG. 2 is a schematic flowchart of a typhoon monitoring system generating a typhoon warning signal based on meteorological information according to an embodiment of the present disclosure.

Specifically, as shown in FIG. 2, the step of generating the typhoon warning signal via the typhoon monitoring system based on meteorological information may include following steps.

Step 201, the typhoon monitoring system may acquire the location of the wind turbine. Specifically, the location of the wind turbine may be acquired via a positioning module of the wind turbine.

Step 202, the typhoon monitoring system may acquire the meteorological information, which may include, but not limited to, the path and intensity of the typhoon. Specifically, the meteorological information may be acquired from a meteorological bureau or via network, which is not limited by the embodiments of the present disclosure.

Step 203, the typhoon monitoring system may determine whether a condition for generating the typhoon warning signal is satisfied or not according to the location of the wind turbine and the meteorological information.

Specifically, the condition for generating the typhoon warning signal may be satisfied, if it is determined that a path of a typhoon passes through the location of the wind turbine and an intensity of the typhoon is greater than a preset intensity threshold, and/or that the location of the wind turbine is located within a typhoon eye or typhoon core region; the condition for generating the typhoon warning signal may not be satisfied, if it is determined that the path of the typhoon passes through the location of the wind turbine but the intensity of the typhoon is smaller than or equal to the preset intensity threshold, and/or that the location of the wind turbine is located within a periphery region of the typhoon. The preset intensity threshold may be set according to an empirical value, for example, the preset intensity threshold may be level 10.

Step 204, the typhoon warning signal may be generated when it is determined at step 203 that the condition for generating the typhoon warning signal is satisfied, and the generated typhoon warning signal may be sent to the wind turbine.

It should be noted that, step 202 may be continually performed to acquire the meteorological information for typhoon monitoring, if it is determined in step 203 that the condition for generating the typhoon warning signal is not met.

Specifically, the current working conditions of the power system, the yaw system and the communication system of the wind turbine may be acquired, when the typhoon warning signal is received, by self-testing of the wind turbine, or by sending test commands to the power system, the yaw system and the communication system respectively, which is not limited by the embodiments of the present disclosure.

Specifically, after acquiring the current working conditions of the power system, the yaw system and the communication system of the wind turbine, and in order to determine a target control strategy corresponding to the current working conditions according to a preset corresponding relationship between control strategies and working conditions of the power system, the yaw system and the communication system, the working conditions of each system may be recorded by using a working condition identifier. For example, identifier "1" may be used to represent that the system is working normally, and identifier "0" may be used to represent that the system is working abnormally. Specifically, abnormal conditions of the power system may include, but not limited to, (1) a power failure of a power grid due to a typhoon; (2) an over-current protection action of a power supply circuit; and (3) a damage of a power supply transformer. Abnormal conditions of the communication system may include, but not limited to, (1) a communication interruption between the wind turbine and a central monitor due to a damage of a submarine cable fiber; (2) a communication failure with the central monitor due to a network abnormality of a communication switch. Abnormal conditions of the yaw system may include, but not limited to, (1) a failure of a yaw drive motor; (2) a failure of a yaw control circuit; (3) a failure of a yaw brake system.

S102, a target control strategy corresponding to the current working conditions may be determined according to a preset corresponding relationship between control strategies and working conditions of the power system, the yaw system and the communication system, wherein the control strategies may include an active windward strategy for controlling the yaw system to face typhoon wind direction, a controlled passive leeward strategy for controlling the yaw system to face opposite to the typhoon wind direction, and a passive leeward strategy for adjusting the yaw system to face opposite to the typhoon wind direction.

Specifically, determining the target control strategy corresponding to the current working conditions according to the preset corresponding relationship between the control strategies and the working conditions of the power system may include: selecting the active windward strategy as the target control strategy if the current working conditions of the power system, the yaw system and the communication system are normal; selecting the controlled passive leeward strategy as the target control strategy if the current working conditions of the power system and the communication system are normal and the current working condition of the yaw system is abnormal; and selecting the passive leeward strategy as the target control strategy if the current working conditions of the power system and the communication system are abnormal.

In an implementation, an embodiment of the present disclosure may also input the current working conditions or the current working condition identifiers of the power system, the yaw system and the communication system into a strategy selection system (corresponding to a processing module in FIG. 5) to determine the target control strategy corresponding to the current working conditions.

Figure 3:
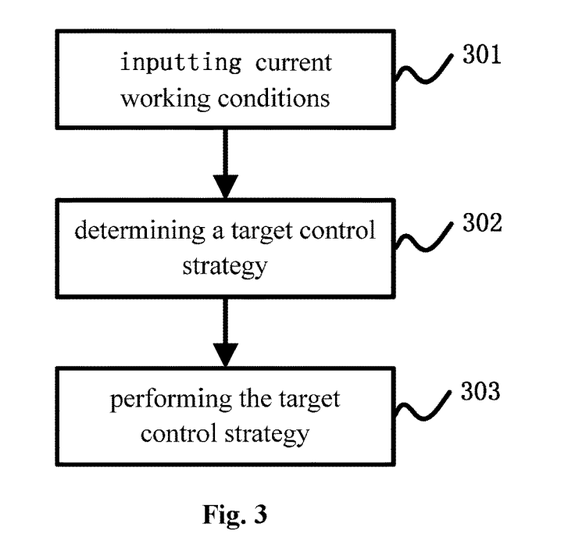
FIG. 3 is a schematic flow chart of determining a target control strategy according to an embodiment of the present disclosure.

The strategy selection system may be preset with a correspondence between the control strategies and the working conditions of the power system, the yaw system and the communication system. The strategy selection system may determine a target control strategy corresponding to the current working conditions according to the preset corresponding relationship between the control strategies and the working conditions of the power system, the yaw system and the communication system, after receiving the input current working conditions or the current working condition identifiers of the power system, the yaw system and the communication system. Specifically, as shown in FIG. 3, the step of determining the target control strategy corresponding to the current working conditions may include following steps.

Step 301, the current working conditions may be input. For example, the current working conditions or the current working condition identifiers of the power system, the yaw system and the communication system of the wind turbine may be input.

Step 302, the target control strategy corresponding to the current working conditions may be determined according to the preset corresponding relationship between the control strategies and the working conditions of the power system, the yaw system and the communication system.

Specifically, the active windward strategy may be selected as the target control strategy if the current working conditions of the power system, the yaw system and the communication system are normal; the controlled passive leeward strategy may be selected as the target control strategy if the current working conditions of the power system and the communication system are normal and the current working condition of the yaw system is abnormal; and the passive leeward strategy may be selected as the target control strategy if the current working conditions of the power system and the communication system are abnormal.

Step 303, the wind turbine may be controlled (by a control module in FIG. 5) to perform the selected target control strategy according to the selection of the strategy selection system.

In an embodiment of the present disclosure, the control strategies included in the preset corresponding relationship may be control strategies which are pre-stored and used to control the wind turbine under various typhoon conditions such that various of components of the wind turbine may bear smaller load. The control strategies may be set by maintenance personnel based on experience.

S103, the wind turbine may be controlled by using the target control strategy.

In an implementation, in order to increase the amount of wind power generation by utilizing a typhoon, when the wind turbine is controlled by using the target control strategy determined in S102, an embodiment of the present disclosure may stop the wind power generation before the typhoon reaches the location of the wind turbine based on a time duration between a time when the typhoon reaches the location of the wind turbine and a current time, and before that, the wind turbine nay continue to be used for power generation.

Specifically, controlling the wind turbine by using the target control strategy may include: receiving a time duration between a time when a predicted typhoon reaches a location of the wind turbine and a current time; stopping wind power generation and controlling the wind turbine by using the active windward strategy, when it is determined that the time duration is less than a first threshold and the target control strategy is the active windward strategy; stopping wind power generation and controlling the wind turbine by using the controlled passive leeward strategy, when it is determined that the time duration is less than a second threshold and the target control strategy is the controlled passive leeward strategy; and stopping wind power generation and controlling the wind turbine by using the passive leeward strategy, when it is determined that the time duration is less than the second threshold and the target control strategy is the passive leeward strategy.

Wherein, the first threshold may be less than the second threshold, and the first threshold and the second threshold may be determined based on an empirical value, for example, the first threshold may be 5 minutes, and the second threshold may be 120 minutes.

Specifically, the time duration between the time when the predicted typhoon reaches the location of the wind turbine and the current time may be periodically received. A larger reception period may be set to reduce calculation amount when the typhoon is far away from the location of the wind turbine; and a smaller reception period may be set when the typhoon is near the location of the wind turbine, such that the wind power generation may be stopped in time and the target control strategy may be performed.

In an implementation, when the wind turbine is controlled by using the active windward strategy, a control command may be sent to the yaw system of the wind turbine based on the change of wind direction so as to instruct the yaw system to yaw to face the typhoon wind direction according to the instruction of the control command.

In an implementation, when the wind turbine is controlled by using the passive leeward strategy, the yaw system may be instructed to release pressure of a yaw brake or loosen a yaw motor brake, and the yaw system of the wind turbine may be yaw to face opposite to the typhoon wind direction.

In an implementation, when the wind turbine is controlled by using the controlled passive leeward strategy, the yaw system of the wind turbine may be instructed to yaw to face opposite to the typhoon wind direction before a typhoon reaches the location of the wind turbine, and a control command may be sent to the yaw system of the wind turbine when the typhoon passes the location of the wind turbine so as to instruct the yaw system to loosen the yaw motor brake and adjust pressure of the yaw brake according to the control command.

In an implementation, in order to ensure that the wind turbine has sufficient twist margin when controlling the yaw system of the wind turbine during a typhoon, an embodiment of the present disclosure may also acquire the twist margin of the yaw system of the wind turbine before controlling the wind turbine by using the target control strategy. Further, if it is determined that the twist margin of the wind turbine is less than a preset margin threshold, the operation of the wind turbine may be suspended and an untwisting operation may be performed. The wind turbine may be controlled by the target control strategy after the untwisting operation is performed. Wherein, the preset margin threshold may be set according to an empirical value, for example, the preset margin threshold may be 360 degree.

In an implementation an embodiment of the present disclosure may also detect whether the wind turbine has a failure after the typhoon passes the location of the wind turbine. For example, each subsystem of the wind turbine (such as a blade component, a mechanical component, a variable pitch component, a lightning protection component, a communication component, etc.) may be self-tested, and whether the wind turbine has a failure may be determined according to a self-test result. A warning message may be displayed to prompt the maintenance personnel to repair the wind turbine, if a failure of the wind turbine (a mechanical failure, a blade failure, or an electrical component failure) is detected.

Figure 4:
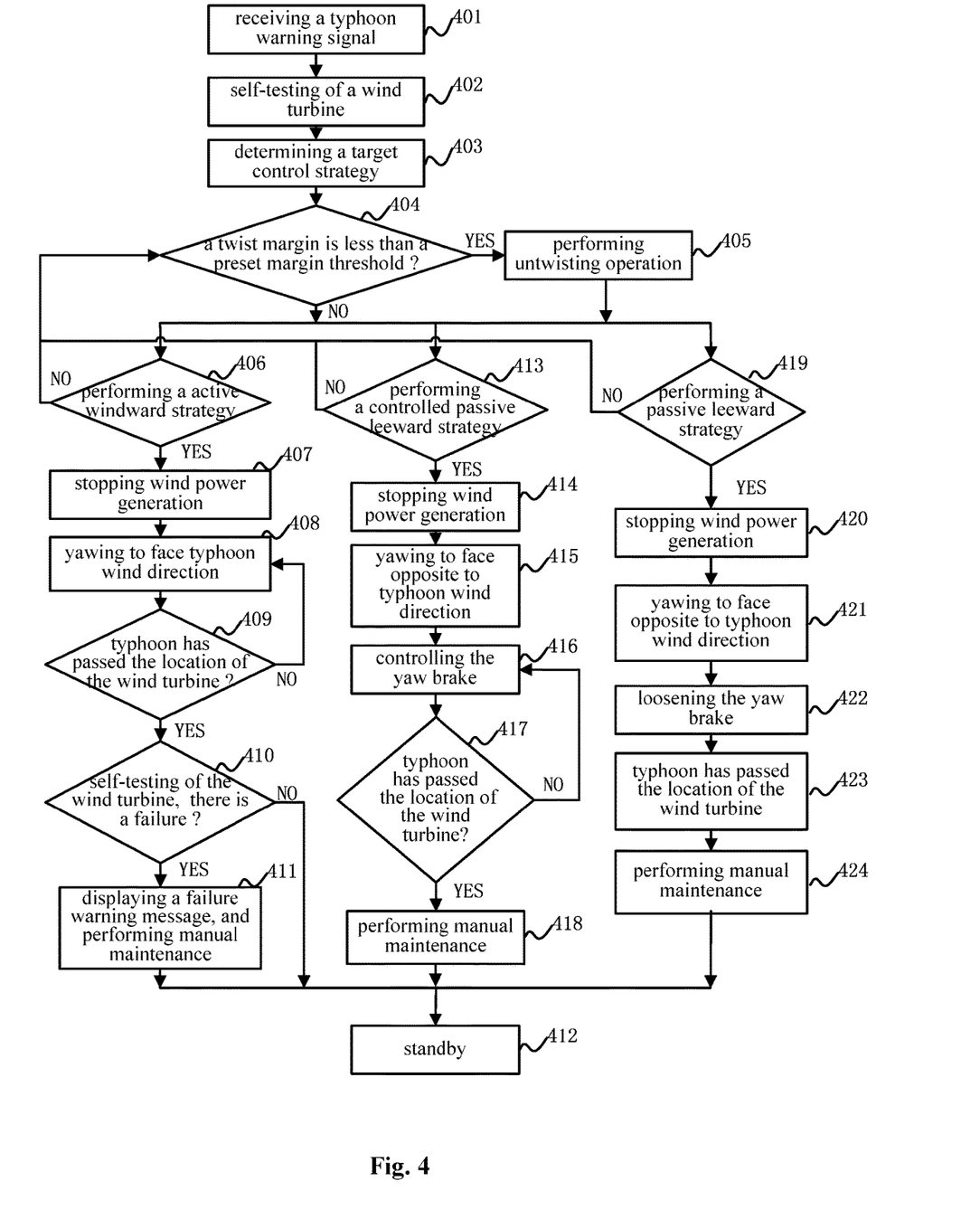
FIG. 4 is a schematic flow chart of a specific flow of a control method for a wind turbine according to an embodiment of the present disclosure.

A specific flow of a control method for a wind turbine according to an embodiment of the present disclosure may be described in detail in combination with FIG. 4. As shown in FIG. 4, the specific flow of the control method for the wind turbine provided by the embodiment of the present disclosure may include following steps.

Step 401, a typhoon warning signal may be received. Specifically, a typhoon warning signal sent by a typhoon monitoring system may be received. Wherein, the typhoon warning signal is generated by monitoring typhoons via the typhoon monitoring system based on meteorological information.

Step 402, self-testing of the wind turbine may be performed. Specifically, current working conditions of a power system, a yaw system and a communication system of the wind turbine may be determined by self-testing of the wind turbine.

Step 403, a target control strategy corresponding to the current working conditions may be determined according to a preset corresponding relationship between control strategies and working conditions of the power system, the yaw system and the communication system.

Specifically, the active windward strategy may be selected as the target control strategy if the current working conditions of the power system, the yaw system and the communication system are normal; the controlled passive leeward strategy may be selected as the target control strategy if the current working conditions of the power system and the communication system are normal and the current working condition of the yaw system is abnormal; and the passive leeward strategy may be selected as the target control strategy if the current working conditions of the power system and the communication system are abnormal.

Step 404, whether a twist margin is less than a preset margin threshold may be determined based on the self-test result. If it is determined yes in step 404, step 405 may be performed, and otherwise, different steps will be select according to the selection of the target control strategy. Specifically, if the target control strategy is the active windward strategy, step 406 may be selected to perform the active windward strategy; if the target control strategy is the controlled passive leeward strategy, step 413 may be selected to perform the controlled passive leeward strategy; and if the target control strategy is the passive leeward strategy, step 419 may be selected to perform the passive leeward strategy. Wherein, the preset margin threshold may be set according to an empirical value, for example, the preset margin threshold may be 360 degree.

Step 405, an untwisting operation may be performed if the twist margin is determined less than the preset margin threshold based on the self-test result.

Step 406, if the twist margin is determined greater than the preset margin threshold based on the self-test result and the target control strategy is the active windward strategy, a time duration between a time when a typhoon reaches a location of the wind turbine and a current time may be received, and whether the time duration is less than a first threshold may be determined. If yes, step 407 may be performed; otherwise, step 404 may be performed. Wherein, the first threshold may be set according to an empirical value, for example, the first threshold may be 5 minutes.

Step 407, the active windward strategy may be performed and wind power generation of the wind turbine may be stopped, if the time duration between the time when the typhoon reaches the location of the wind turbine and the current time is less than the first threshold.

Step 408, when the typhoon passes the location of the wind turbine, a control command may be sent to the yaw system of the wind turbine based on the change of wind direction so as to instruct the yaw system to yaw to face typhoon wind direction according to the instruction of the control command.

Step 409, whether the typhoon has passed the location of the wind turbine may be determined. If yes, step 410 may be performed; otherwise, step 408 may be performed continually to yaw to face the typhoon wind direction.

Step 410, when it is determined that the typhoon has passed the location of the wind turbine, self-testing of the wind turbine may be performed, and whether the wind turbine has a failure may be determined according to a self-test result. If yes, step 411 may be performed; otherwise, step 412 may be performed.

Step 411, if a failure of the wind turbine is detected, a warning message may be displayed and manual maintenance may be required.

Step 412, after manual maintenance of the wind turbine, or if it is determined that there is no failure in the wind turbine according to the self-test result, the wind turbine may enter a standby state.

Step 413, if the twist margin is determined greater than the preset margin threshold based on the self-test result and the target control strategy is the controlled passive leeward strategy, the time duration between the time when the typhoon reaches the location of the wind turbine and the current time may be received, and whether the time duration is less than a second threshold may be determined. If yes, step 414 may be performed; otherwise, step 404 may be performed. Wherein, the second threshold may be set according to an empirical value, for example, the second threshold may be 120 minutes.

Step 414, the controlled passive leeward strategy may be performed and the wind power generation of the wind turbine may be stopped, if the time duration between the time when the typhoon reaches the location of the wind turbine and the current time is less than the second threshold.

Step 415, the yaw system of the wind turbine may be instructed to yaw to face opposite to the typhoon wind direction before the typhoon reaches the location of the wind turbine.

Step 416, when the typhoon passes the location of the wind turbine, a control command may be sent to the yaw system of the wind turbine so as to instruct the yaw system to loosen a yaw motor brake and adjust pressure of a yaw brake according to the control command.

Step 417, whether the typhoon has passed the location of the wind turbine may be determined. If yes, step 418 may be performed; otherwise, step 416 may be performed continually to instruct the yaw system to loosen the yaw motor brake and adjust the pressure of the yaw brake according to the control command.

Step 418, when it is determined that the typhoon has passed the location of the wind turbine, the failure existing in the wind turbine may be manually repaired. After manual maintenance of the wind turbine, step 412 may be performed, and the wind turbine may enter the standby state.

Step 419, if the twist margin is determined greater than the preset margin threshold based on the self-test result and the target control strategy is the passive leeward strategy, the time duration between the time when the typhoon reaches the location of the wind turbine and the current time may be received, and whether the time duration is less than the second threshold may be determined. If yes, step 420 may be performed; otherwise, step 404 may be performed. Wherein, the second threshold may be set according to an empirical value, for example, the second threshold may be 120 minutes.

Step 420, the passive leeward strategy may be performed and the wind power generation of the wind turbine may be stopped, if the time duration between the time when the typhoon reaches the location of the wind turbine and the current time is less than the second threshold.

Step 421, the yaw system of the wind turbine may be instructed to yaw to face opposite to the typhoon wind direction.

Step 422, the yaw system may be instructed to release pressure of the yaw brake or loosen the yaw motor brake.

Step 423, waiting for the typhoon to pass through the location of the wind turbine.

Step 424, when it is determined that the typhoon has passed the location of the wind turbine, the failure existing in the wind turbine may be manually repaired. After manual maintenance of the wind turbine, step 412 may be performed, and the wind turbine may enter the standby state.

In above embodiments, the current working conditions of the wind turbine may be acquired when the typhoon warning signal is received; and the target control strategy corresponding to the current working conditions may be determined according to the preset corresponding relationship between the control strategies and the working conditions of the power system, the yaw system and the communication system. Therefore, the target control strategy most suitable for the current working conditions of the wind turbine may be selected, and the safety of the wind turbine under typhoon conditions may be improved. Meanwhile, controlling the wind turbine by using the target control strategy may also reduce the workload of maintenance personnel during the typhoon.

Figure 5:
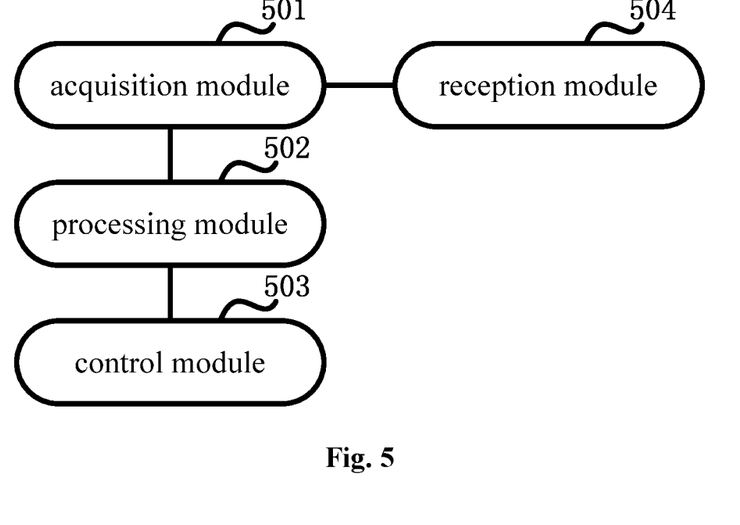
FIG. 5 is a schematic structural diagram of a control device for a wind turbine according to an embodiment of the present disclosure.

Based on the same inventive concept, an embodiment of the present disclosure also provides a control device for a wind turbine. As shown in FIG. 5, the control device for the wind turbine provided by the embodiment of the present disclosure may include: an acquisition module 501 configured to acquire current working conditions of a power system, a yaw system and a communication system of the wind turbine when a typhoon warning signal is received; a processing module 502 configured to determine a target control strategy corresponding to the current working conditions according to a preset corresponding relationship between control strategies and working conditions of the power system, the yaw system and the communication system, wherein the control strategies comprise an active windward strategy for controlling the yaw system to face typhoon wind direction, a controlled passive leeward strategy for controlling the yaw system to face opposite to the typhoon wind direction, and a passive leeward strategy for adjusting the yaw system to face opposite to the typhoon wind direction; and a control module 503 configured to control the wind turbine by using the target control strategy.

In an implementation, the control device may further include: a reception module 504 configured to receive the typhoon warning signal generated by a typhoon monitoring system via monitoring typhoons based on meteorological information.

In an implementation, the control module may be further configured to: select the active windward strategy as the target control strategy if the current working conditions of the power system, the yaw system and the communication system are normal; select the controlled passive leeward strategy as the target control strategy if the current working conditions of the power system and the communication system are normal and the current working condition of the yaw system is abnormal; and select the passive leeward strategy as the target control strategy if the current working conditions of the power system and the communication system are abnormal.

In an implementation, when the target control strategy is the active windward strategy, the control module 503 may be further configured to send a control command to the yaw system of the wind turbine to instruct the yaw system to yaw to face the typhoon wind direction according to the instruction of the control command; when the target control strategy is the passive leeward strategy, the control module 503 may be further configured to instruct the yaw system of the wind turbine to yaw to face opposite to the typhoon wind direction; and when the target control strategy is the controlled passive leeward strategy, the control module 503 may be further configured to instruct the yaw system of the wind turbine to yaw to face opposite to the typhoon wind direction, and send a control command to the yaw system of the wind turbine when a typhoon passes a location of the wind turbine so as to instruct the yaw system to loosen a yaw motor brake and adjust pressure of a yaw brake according to the control command.

In an implementation, the control module 503 may be further configured to: receive a time duration between a time when a predicted typhoon reaches a location of the wind turbine and a current time; stop wind power generation and control the wind turbine by using the active windward strategy, when it is determined that the time duration is less than a first threshold and the target control strategy is the active windward strategy; stop wind power generation and control the wind turbine by using the controlled passive leeward strategy, when it is determined that the time duration is less than a second threshold and the target control strategy is the controlled passive leeward strategy; and stop wind power generation and control the wind turbine by using the passive leeward strategy, when it is determined that the time duration is less than the second threshold and the target control strategy is the passive leeward strategy, wherein the first threshold may be less than the second threshold.

In an implementation, the control module 503 may be further configured to: acquire a twist margin of the yaw system of the wind turbine; control the yaw system to untwist and control the wind turbine by using the target control strategy, if it is determined that the twist margin is less than a preset margin threshold.

In an implementation, the control device of the wind turbine may be arranged in a main controller of the wind turbine.

Further, an embodiment of the present disclosure provides a control system for a wind turbine, including the control device for the wind turbine provided by the embodiment of the present disclosure and a typhoon monitoring system, wherein the control device for the wind turbine may be communicatively coupled to the typhoon monitoring system.

In an implementation, the typhoon monitoring system is a supervisory control and data acquisition (SCADA) system.

The control method, device and system for the wind turbine provided by the embodiments of the present disclosure may acquire the current working conditions of the wind turbine when the typhoon warning signal is received; and determine the target control strategy corresponding to the current working conditions according to the preset corresponding relationship between the control strategies and the working conditions of the power system, the yaw system and the communication system. Therefore, the target control strategy most suitable for the current working conditions of the wind turbine may be selected, and the safety of the wind turbine under the typhoon conditions may be improved. Meanwhile, controlling the wind turbine by using the target control strategy may also reduce the workload of maintenance personnel during the typhoon.

It should be clear that the embodiments in this specification are described in a progressive manner, and the same or similar parts in each embodiment may be referred to each other, and each embodiment focuses on the difference from other embodiments. For device embodiments, relevant parts can be referred to the description of the method embodiments. The embodiments of the present disclosure are not limited to the specific steps and structures described above and shown in the drawings. Those skilled in the art can make various changes, modifications and additions or changing the order between steps after understanding the spirit of the embodiments of the present disclosure. Also, for the sake of brevity, detailed descriptions of known methods and techniques are omitted here.

It should be clear that the embodiments of the present disclosure are not limited to the specific configurations and processes described above and illustrated in the drawings. Also, for the sake of brevity, a detailed description of known techniques is omitted herein. In the above embodiments, several specific steps have been described and illustrated as examples. However, the method steps of the embodiments of the present disclosure are not limited to the specific steps described above and shown in the drawings. Those skilled in the art can make various changes, modifications and additions or changing the order between steps after understanding the spirit of the embodiments of the present disclosure.

The functional blocks shown in the block diagrams described above may be implemented as hardware, software, firmware, or a combination thereof. When implemented in hardware, it may be, for example, an electronic circuit, an application specific integrated circuit (ASIC), suitable firmware, plug-ins, function cards, and the like. When implemented in software, the elements of an embodiment of the present disclosure are programs or code segments that are used to perform the required tasks. Programs or code segments may be stored on a machine-readable medium or transmitted over a transmission medium or communication link via a data signal carried in a carrier wave. The "machine-readable medium" may include any medium that is capable of storing or transmitting information. Examples of machine-readable media include electronic circuitry, semiconductor memory devices, ROMs, flash memory, erasable ROM (EROM), floppy disks, CD-ROMs, optical disks, hard disks, fiber optic media, radio frequency (RF) links, and the like. The code segments may be downloaded via a computer network such as the Internet, an intranet or the like.

Those skilled in the art will understand that all the above embodiments are exemplary and non-limiting. Different technical features in different embodiments may be combined to achieve beneficial results. Those skilled in the art should be able to understand and implement other varied embodiments of the disclosed ones by studying the drawings, the specification and the claims. In the claims, the term "comprise" does not exclude other devices and steps; the indefinite article "a" does not exclude a plurality; the terms "first", "second" are used to indicate a name rather than to specify any particular order. Any reference numerical in the claims should not be construed as limiting the scope of protection. Functions of a plurality of parts in the claims may be implemented by a single hardware or software module. The presence of certain technical features in different dependent claims does not imply that these technical features cannot be combined to achieve beneficial results.

What is claimed is:

1. A control method for a wind turbine, comprising:
   acquiring current working conditions of a power system, a yaw system and a communication system of the wind turbine when a typhoon warning signal is received;
   determining a target control strategy corresponding to the current working conditions according to a preset corresponding relationship between control strategies and working conditions of the power system, the yaw system and the communication system, wherein the control strategies comprise an active windward strategy for controlling the yaw system to face typhoon wind direction, a controlled passive leeward strategy for controlling the yaw system to face opposite to the typhoon wind direction, and a passive leeward strategy for adjusting the yaw system to face opposite to the typhoon wind direction; and
   controlling the wind turbine by using the target control strategy.

2. The control method according to claim 1, wherein before acquiring the current working conditions of the power system, the yaw system and the communication system of the wind turbine, the control method further comprises:
receiving the typhoon warning signal generated by a typhoon monitoring system via monitoring typhoons based on meteorological information.

3. The control method according to claim 1, wherein determining the target control strategy corresponding to the current working conditions according to the preset corresponding relationship between the control strategies and the working conditions of the power system comprises:
selecting the active windward strategy as the target control strategy if the current working conditions of the power system, the yaw system and the communication system are normal;
selecting the controlled passive leeward strategy as the target control strategy if the current working conditions of the power system and the communication system are normal and the current working condition of the yaw system is abnormal; and
selecting the passive leeward strategy as the target control strategy if the current working conditions of the power system and the communication system are abnormal.

4. The control method according to claim 3, wherein controlling the wind turbine by using the active windward strategy comprises;
sending a control command to the yaw system of the wind turbine to instruct the yaw system to yaw to face the typhoon wind direction according to the instruction of the control command.

5. The control method according to claim 3, wherein controlling the wind turbine by using the passive leeward strategy comprises:
instructing the yaw system of the wind turbine to yaw to face opposite to the typhoon wind direction.

6. The control method according to claim 3, wherein controlling the wind turbine by using the controlled passive leeward strategy comprises:
instructing the yaw system of the wind turbine to yaw to face opposite to the typhoon wind direction, and sending a control command to the yaw system of the wind turbine when a typhoon passes a location of the wind turbine so as to instruct the yaw system to loosen a yaw motor brake and adjust pressure of a yaw brake according to the control command.

7. The control method according to claim 1, wherein controlling the wind turbine by using the target control strategy comprises:
receiving a time duration between a time when a predicted typhoon reaches a location of the wind turbine and a current time;
stopping wind power generation and controlling the wind turbine by using the active windward strategy, when it is determined that the time duration is less than a first threshold and the target control strategy is the active windward strategy;
stopping wind power generation and controlling the wind turbine by using the controlled passive leeward strategy, when it is determined that the time duration is less than a second threshold and the target control strategy is the controlled passive leeward strategy; and
stopping wind power generation and controlling the wind turbine by using the passive leeward strategy, when it is determined that the time duration is less than the second threshold and the target control strategy is the passive leeward strategy,
wherein the first threshold is less than the second threshold.

8. The control method according to claim 1, wherein controlling the wind turbine by using the target control strategy comprises:
acquiring a twist margin of the yaw system of the wind turbine;
controlling the yaw system to untwist and controlling the wind turbine by using the target control strategy, if it is determined that the twist margin is less than a preset margin threshold.

9. A control device for a wind turbine, comprising:
a processor; and
a memory configured to store instructions executable by the processor,
wherein the processor is configured to:
acquire current working conditions of a power system, a yaw system and a communication system of the wind turbine when a typhoon warning signal is received;
determine a target control strategy corresponding to the current working conditions according to a preset corresponding relationship between control strategies and working conditions of the power system, the yaw system and the communication system, wherein the control strategies comprise an active windward strategy for controlling the yaw system to face typhoon wind direction, a controlled passive leeward strategy for controlling the yaw system to face opposite to the typhoon wind direction, and a passive leeward strategy for adjusting the yaw system to face opposite to the typhoon wind direction; and
control the wind turbine by using the target control strategy.

10. The control device according to claim 9, wherein the processor is further configured to:
receive the typhoon warning signal generated by a typhoon monitoring system via monitoring typhoons based on meteorological information.

11. The control device according to claim 9, wherein the processor is further configured to:
select the active windward strategy as the target control strategy if the current working conditions of the power system, the yaw system and the communication system are normal;
select the controlled passive leeward strategy as the target control strategy if the current working conditions of the power system and the communication system are normal and the current working condition of the yaw system is abnormal; and
select the passive leeward strategy as the target control strategy if the current working conditions of the power system and the communication system are abnormal.

12. The control device according to claim 11, wherein
when the target control strategy is the active windward strategy, the processor is further configured to send a control command to the yaw system of the wind turbine to instruct the yaw system to yaw to face the typhoon wind direction according to the instruction of the control command;
when the target control strategy is the passive leeward strategy, the processor is further configured to instruct the yaw system of the wind turbine to yaw to face opposite to the typhoon wind direction; and when the target control strategy is the controlled passive leeward strategy, the processor is further configured to instruct the yaw system of the wind turbine to yaw to face opposite to the typhoon wind direction, and send a control command to the yaw system of the wind turbine when a typhoon passes a location of the wind turbine so as to instruct the yaw system to loosen a yaw motor brake and adjust pressure of a yaw brake according to the control command.

13. The control device according to claim 12, wherein the processor is further configured to:
receive a time duration between a time when a predicted typhoon reaches a location of the wind turbine and a current time;
stop wind power generation and control the wind turbine by using the active windward strategy, when it is determined that the time duration is less than a first threshold and the target control strategy is the active windward strategy;
stop wind power generation and control the wind turbine by using the controlled passive leeward strategy, when it is determined that the time duration is less than a second threshold and the target control strategy is the controlled passive leeward strategy; and
stop wind power generation and control the wind turbine by using the passive leeward strategy, when it is determined that the time duration is less than the second threshold and the target control strategy is the passive leeward strategy,
wherein the first threshold is less than the second threshold.

14. The control device according to claim 9, wherein the processor is further configured to:
acquire a twist margin of the yaw system of the wind turbine;
control the yaw system to untwist and control the wind turbine by using the target control strategy, if it is determined that the twist margin is less than a preset margin threshold.

15. The control device according to claim 14, wherein the control device is arranged in a main controller of the wind turbine.

16. A control system for a wind turbine, comprising the control device for the wind turbine according to claim 9 and a typhoon monitoring system, wherein the control device is communicatively coupled to the typhoon monitoring system.

17. The control system according to claim 16, wherein the typhoon monitoring system is a SCADA system.

18. A non-transitory computer readable storage medium comprising instructions that, when executed by a processor, cause the processor to perform the control method for the wind turbine according to claim 1.

* * * * *